United States Patent [19]

Miklos

[11] Patent Number: 5,226,117
[45] Date of Patent: Jul. 6, 1993

[54] METHOD FOR SIMULTANEOUS UPDATE AND CHANGE IN PARENT AND CHILD WINDOWS

[75] Inventor: Sarka J. Miklos, Ramsey, N.J.

[73] Assignee: International Business Machines Corporation, Armonk, N.Y.

[21] Appl. No.: 524,774

[22] Filed: May 15, 1990

[51] Int. Cl.$^5$ .......................................... G06F 15/403
[52] U.S. Cl. ..................................... 395/157; 395/146
[58] Field of Search .................. 395/157, 160, 147, 146

[56] References Cited

U.S. PATENT DOCUMENTS

| | | | |
|---|---|---|---|
| 4,823,303 | 4/1989 | Terasawa | 395/157 X |
| 4,829,294 | 5/1989 | Iwami et al. | 395/157 X |
| 4,933,880 | 6/1990 | Borgendale et al. | 395/147 |
| 4,962,475 | 10/1990 | Hernandez et al. | 395/157 X |

OTHER PUBLICATIONS

"MacIntosh ® System Software User's Guide, Version 6.0" 1988, pp. 226-227.

*Primary Examiner*—Mark K. Zimmerman
*Attorney, Agent, or Firm*—John D. Flynn; Jeffrey S. LaBaw

[57] ABSTRACT

A technique which automatically updates and changes hierarchically related windows of an application. Code stored in the memory of a data processing system performs an automatic search on the data structures associated with each window also stored in memory to determine whether the window is related to the window in which the user is currently manipulating data. If the window is related, another search is performed to determine whether the related window also contains the data to be changed. Once all occurrences of the data within the related windows have been identified, the simultaneous update of the data within all related windows is performed. In the preferred embodiment, the method is implemented by a set of programs for controlling a data processing system. The data processing system includes a processor, a memory, and a display. Other elements preferably included in such a data processing system include a printer, a read only memory disk storage and I/O equipment. The memory stores a set of program modules which provides instructions to the processor to control the graphical interface presented on the display and to manipulate data entered by the user by the keyboard, mouse or other input means. The memory also stores code which controls the automatic updating of the related windows in the multiwindowing environment. Further, the memory stores a database which contains the data structures associated with each of the windows and icons therein.

11 Claims, 9 Drawing Sheets

METHOD FOR SIMULTANEOUS UPDATE AND CHANGE IN PARENT AND CHILD WINDOWS

DESCRIPTION

1. Technical Field

This invention relates in general to methods for inputting global changes into a computer application program. More particularly this invention relates to a technique for automatically and simultaneously updating both parent and child windows within a multiwindow graphical user interface.

2. Background of the Invention

It is well known to manipulate, alter or delete data blocks within a computer stored document. Many programs allow user to interact with a single window and perform actions based on the location of a cursor. For example, the user may enter data or text perform a search for particular block of data or perform cut and paste operations within a computer application program. In multiwindowing applications, it is known to locate a cursor within one window for an operation and hereafter move the cursor to a second window for similar operations.

The prior art also contains integrated operating environments such as WINDOWS ™ and Presentation Manager ™ which allow multiple applications to run in windows displayed concurrently on the computer display. Typically, only one of the windows is active at a particular time. At least two prior art techniques have been proposed techniques in such environments where data can be entered simultaneously into a plurality of active computer application windows. In the first of these techniques, the user physically locates the multiple windows such that a portion of each window is overlapped by the other windows in which data is to be entered. A display attribute associated with each window is utilized to determine whether the common overlapping area is to be shared with the other windows. If so, the data entered into the common overlapping area of one application is shared by the other computer application programs.

A second method for entering data into multiple application windows utilizes a "global" cursor. The user designates a location within each application window to position the global cursor. Thereafter, data entered or manipulated using the global cursor within one window would be automatically and concurrently entered within each window having such a global cursor positioned therein.

None of the known prior art techniques address concurrent entry and manipulation of data within parent and child windows of the same application. Further, all of the prior art techniques require that accurate manipulation of the windows or global cursors be assured, otherwise data entry into the applications may be inaccurate.

SUMMARY OF THE INVENTION

It is therefore one object of the present invention to concurrently update parent and child windows within a multiwindowing environment.

It is another object of the present invention to manipulate data concurrently in multiple windows without the need to accurately position global cursors and/or window.

It is another object of the present invention to update uncommitted changes in child windows when a parent application window is closed.

These and other objects of the invention are accomplished by a technique which upon the appropriate input by the user, performs an automatic search on the data structures associated with each window to determine whether the window is hierarchically related to the window in which the user is currently manipulating data. If the window is hierarchically related, another search is performed to determine whether the related window also contains the data to be changed. In the preferred embodiment, the method is implemented by a set of programs for controlling a data processing system. The data processing system includes a processor, a memory, and a display. Other elements preferably included in such a data processing system include a printer, a read only memory, disk storage and I/O equipment. The memory stores a set of program modules which provides instructions to the processor to control the graphical interface presented on the display and to manipulate data entered by the user by the keyboard, mouse or other input means. The memory also stores code which controls the automatic updating of the related windows in the multiwindowing environment. Further, the memory stores a database which contains the data structures associated with each of the windows and icons therein.

According to the preferred embodiment of the invention, once the user has indicated that a particular piece of data is to be updated within a first window, a search is performed to determine which other windows within the graphical user interface are hierarchically and logically related to the first window. This is done by searching the data structure associated with the first window for related windows, or by searching the instance data associated with the icon to be updated. Once the list of related windows is established, a second search is conducted to determined whether the data to be changed is within the related windows and if so, the location of the data within the related windows. Once all occurrences of the data within the hierarchically and logically related windows have been identified, the simultaneous update of the data within all related windows is performed.

BRIEF DESCRIPTION OF THE DRAWINGS

These and other objects, features and advantages will be more fully understood by reference to the following description of two illustrative embodiments in conjunction with the accompanying drawings.

DESCRIPTION OF THE PREFERRED EMBODIMENT

The invention can be utilized in a distributed data processing system such as the IBM 3090 mainframe attached to a plurality individual workstations. Alternatively, invention could be implemented in the stand alone processor such as a personal computer, for example an IBM PS/2 TM computer. Further, in the preferred embodiment, the invention is implemented in a local area network (LAN), such as that used with the OfficeVision/2 software. In general, the invention can be implemented in any hardware configuration which includes the components described in the following illustrative embodiment.

Figure 1:
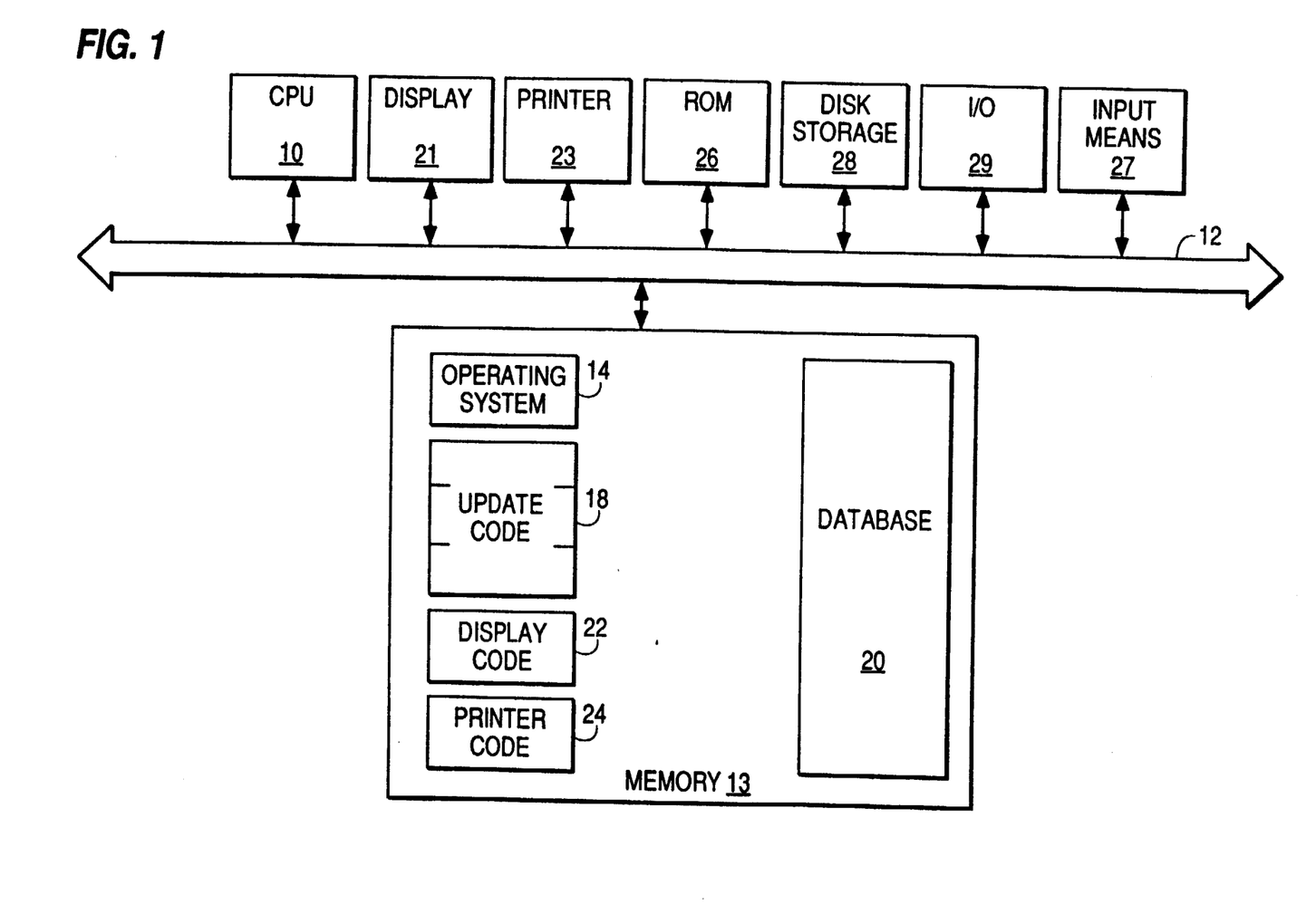
FIG. 1 is an architectural block diagram for a data processing system built in accordance with the preferred embodiment of the present invention.

The preferred embodiment of the invention includes a set of programs for controlling a data processing system such as shown in FIG. 1. A processor 10 is connected via system bus 12 to a memory 13. The memory 13 stores a set of program instructions in the form of code modules. Operating system functions are performed by the code in module 14. The code in module 18 perform the update operations of related windows. Upon the appropriate input by the user, the update code 18 checks the data structure associated with the window to determine which other windows are related to the active window. It then checks the hierarchically related windows to determine whether the item to be updated is present in the related window. The code 18 then enables the user to automatically change all occurrences of the item in related windows. The instructions to control display 21 are stored in the code in module 22. The printer 23 is controlled by the use of the printer code in module 24. Also included in the data processing system of FIG. 1, is a read only memory 26 which contains fixed instructions which are executed by the processor 10 to carry out elementary operations for the system. Disk storage 28 can permanently store code modules when they are not in use in memory 13. The I/O 29 is connected to communication lines or other I/O equipment for communication by the processor 10 with external equipment. Input means 27, typically a keyboard and a mouse pointing device, allow a user to enter commands to the data processing system.

As disclosed earlier, to facilitate use of a data processing system as depicted in FIG. 1, a graphical user interface may be developed. Further, it has been recognized that it is easier for computer users to interact with the data processing system if the graphical interfaces are consistent from application to application. In the illustrative embodiment discussed in these pages, the preferred embodiment has been designed to the set of guidelines called Common User Access (CUA). CUA has been specifically developed for the Presentation Manager and OS/2 environment. One example of an environment in which the user graphical interface would be found is the IBM OfficeVision/2 application. OfficeVision/2 simulates a real work place, the display depicts mail baskets, file cabinets, telephone and printers as icons in the graphical interface. Presentation Manager allows many applications to share the screen within parts of the display screen called windows. Users control the size and arrangement of these windows on the display 21.

Figure 2:
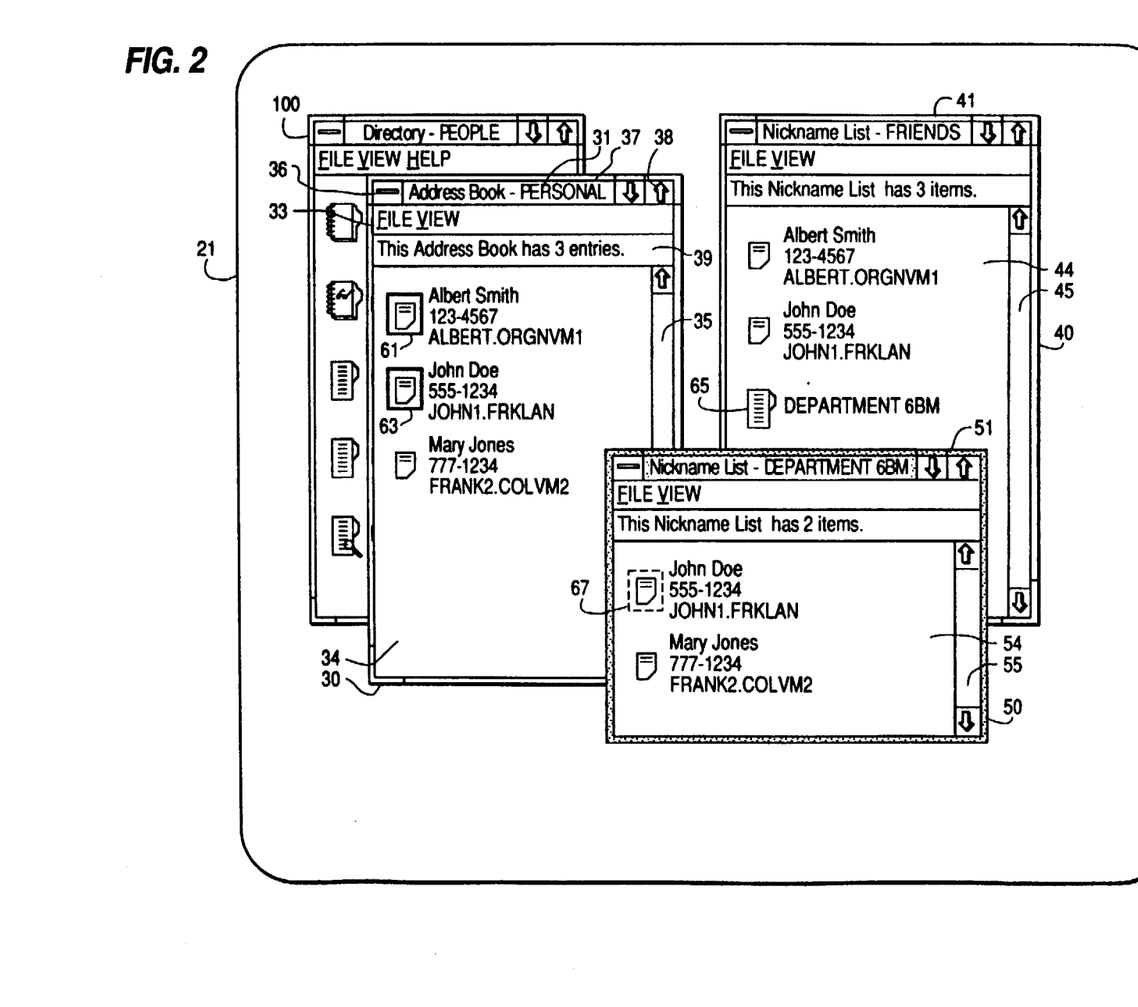
FIG. 2 is a pictorial representation of a computer display of a multiwindow graphical interface, displaying a people directory window having three child windows.

FIG. 2 shows a pictorial representation of a computer display 21 designed in accordance with CUA guidelines and the present invention. The primary window 30 shown in FIG. 2 depicts the personal address book found in the directory function in IBM OfficeVision/2. In CUA, every application has a primary window 30. The primary window has a title bar 31, an action bar 33, a client area 34 and one or more scroll bars 35. The title bar 31 identifies a window 30 to the users and consists of three parts: the system menu icon 36, the window title 37 and the window sizing icons 38. The system menu icon 36 can be selected by the user to display a pull down containing the actions that users can perform on the window. The actions in the pull-down are typically restore, move, size, minimize, maximize and close. The window title 37 of the primary window 30 contains the application name or the OS/2 file name, if any. The window sizing icons 38 provide an efficient way to use a mouse pointing device to either minimize, maximize or restore a window 30. The window 30 also includes a comment bar 39 which lists the number of entries contained in the window, although a comment bar 39 is not a usual feature of window which follow the CUA guidelines. The client area 34 is the portion of the window 30 in which most of the interaction between user and computer takes place. For some types of applications such as editors and word processors, the client area as presented is completely blank. For other types of applications, the client areas are customized to contain menus or a set of entry boxes in which information can be entered. Scroll bars 35 provides users a cue that more information is available and that unseen information can be manipulated into view by using a mouse or cursor keys to scroll information.

Further, in CUA, there are supplemental windows which are generally child windows of the primary window 30 which enable an application to facilitate dialogue with a user. These are grouped in the two categories of secondary windows and dialogue boxes. A secondary window resembles a primary window and is sizeable and movable. A secondary window may be called by choosing one of the actions on the action bar of the primary window. A dialog box is movable, however, it is fixed in size and is used when the user must be queried for information to complete an action.

In FIG. 2, address book window 30 and nickname list windows 40 and 50 are "child" windows of people directory window 100. Directory window 100 is a "parent" window of the two nickname list windows 40 and 50. The FRIENDS nickname list window 40 is a child window one degree removed from the directory window 100, and the department 6BM nickname list 50 is a child window two degrees removed from the directory window 100. As shown by the reverse video title bar 51, department 6BM window 50 is the active window. In some hierarchical nomenclatures, the department 6BM nickname list window 50 would be a "grandchild" of the directory window 100, and the address book window 30 would be a "grandparent" window of the department 6BM nickname list window 50. In the following pages, it should be understood that the term "parent" window is intended to embrace all higher-level windows of direct relation to the active window, i.e., parent, grandparent, great-grandparent etc., but not uncle, great-uncle, etc.. A "child" window is intended to embrace all lower-level windows directly related to the active window, i.e., child, grand-child, etc., but not nephew windows.

Programming which is structured in a hierarchical manner has become particularly popular in the word processing area, e.g., a number of paragraph elements are child elements of a chapter element, and a number of chapter elements are child elements of the document element and so forth. The use of hierarchically nested windows is newer, although not novel to the present invention. The iconic and graphical presentation of windows involve data structures which are much more complex than those in text processing. Techniques for global changes in text processors are of little use in a multiwindowing environment.

The pictorial representation in FIG. 2 depicts the display which would be presented to the user after the three windows 30, 40 and 50 were opened an the Albert Smith and Joe Doe elements 61 and 63 were marked for further processing. The directory window 100 from which the address book window 30 and nickname list window 40 were opened is largely hidden from view by the address book window 30. As the directory window is a parent window to all of the windows depicted in FIG. 2, when the elements 61 and 63 are updated, changes will be made to the directory as well. The nickname list window 50 for department 6BM can be opened by placing the cursor on the department 6BM icon 65 in the Friends nickname list window 40, and issuing a double click from the mouse pointing device. The dotted box 67 around the John Doe icon denotes current cursor position.

Figure 3:
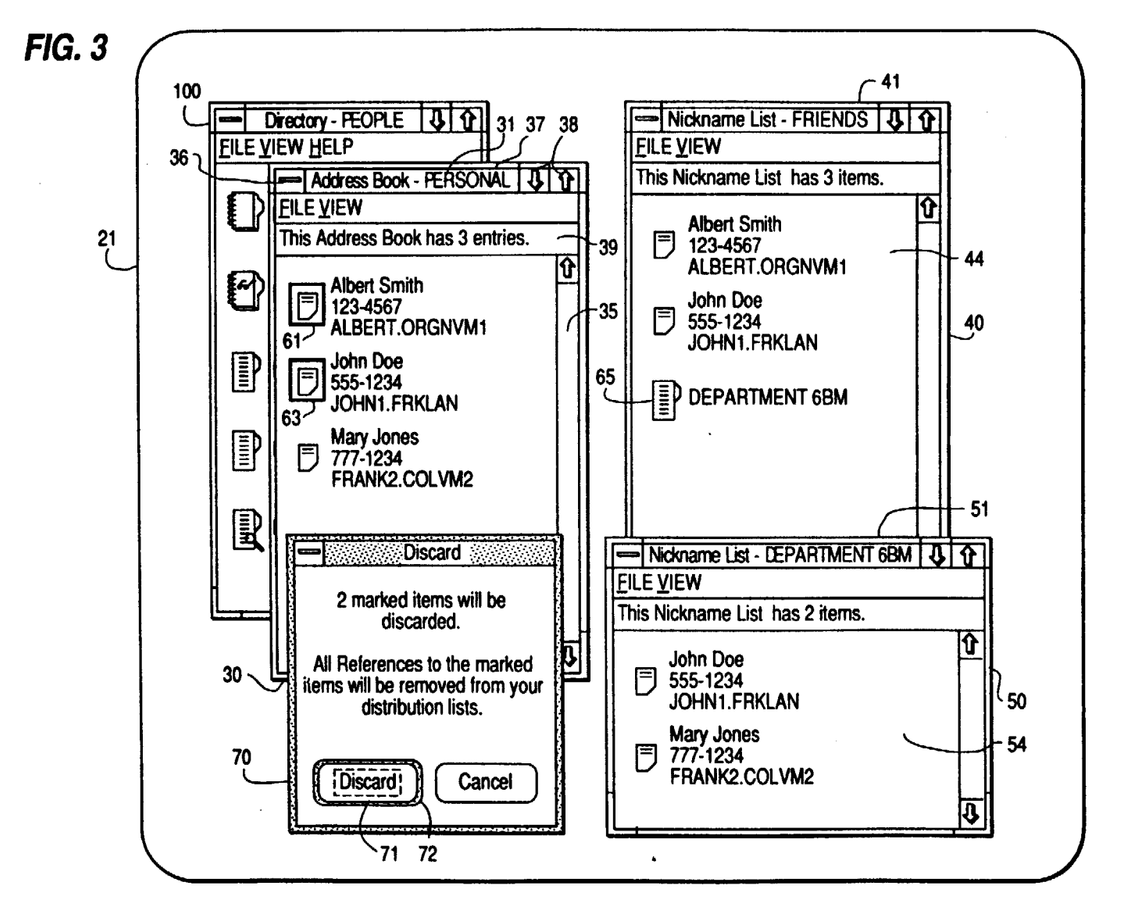
FIG. 3 is a pictorial representation of the windows depicted in FIG. 2 where one item in the parent address book window has been marked for deletion.

In FIG. 3, the user has indicated that she wants to discard the two marked elements 61 and 63. A dialog box 70 has appeared on the display to remind the user that all reference to the marked items will be removed from all her distribution lists in the directory upon completing the operation. The box 70 also gives the user an opportunity to cancel the request if complete deletion is not what was planned. The user has moved the cursor 71 to the discard push button 72 to execute the delete action by entering an input from the keyboard or mouse pointing device.

Upon receiving the delete command from the user the update code 18 first determines which elements in the window have been marked for updating by interactively examining each icon in the window. Once the code 18 identifies a marked icon, it copies the data structure associated with the icon to memory. In CUA, the data structure associated with icon is called instance data. Next, the update code determines which related parent and child windows also contain the marked icon. This can be done in one of two ways. First, the update code 18 can search the data structure associated with the window in which the marked elements are present to determine what are the related windows. Next, the code would search all of the related windows for the presence and location of the marked icon elements. Second, and the preferred method for the directory embodiment, the instance data associated with the marked icons is stored at the root window, the directory window is searched for information which indicates related windows also contain the marked icons.

Figure 4:
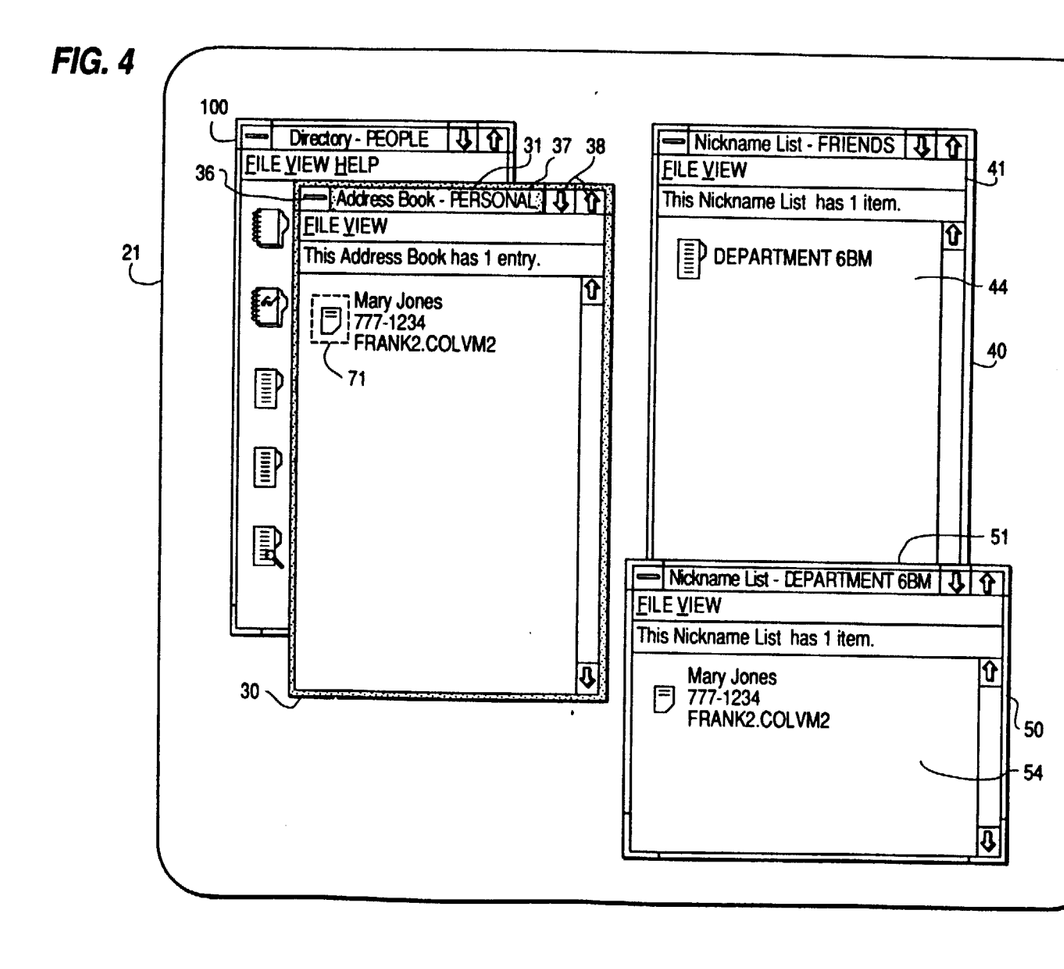
FIG. 4 is a pictorial representation of the windows depicted in FIGS. 2 and 3 wherein the marked item has been deleted.

These windows are searched for the location of marked icon elements in the window. Once all instances of the marked icons are located in related window, the update code 18 consults with the application for the operation to be performed in all occurrences of the marked icon. In the case of the embodiment illustrated in FIGS. 2 through 4, a delete action is selected by the user. FIG. 4, shows the result of a completed delete action.

In the embodiment above, the software designer has elected to update all references to the marked icon element in all windows automatically. This is consistent with rules of the directory in OfficeVision/2 which requires consistency between all related windows in the application. However, in alternate embodiments of the inventions, a user may only wish to update some but not all occurrences of the marked icon element. An intermediate window could be presented to the user after the search, containing a menu identifying all occurrences of the marked icons in which the user selects which occurrences should be updated. Those skilled in the art would recognize that a variety of operations such as modify, rename, copy and others can be accomplished according to the present invention in addition to the delete operation presented above.

Figure 5:
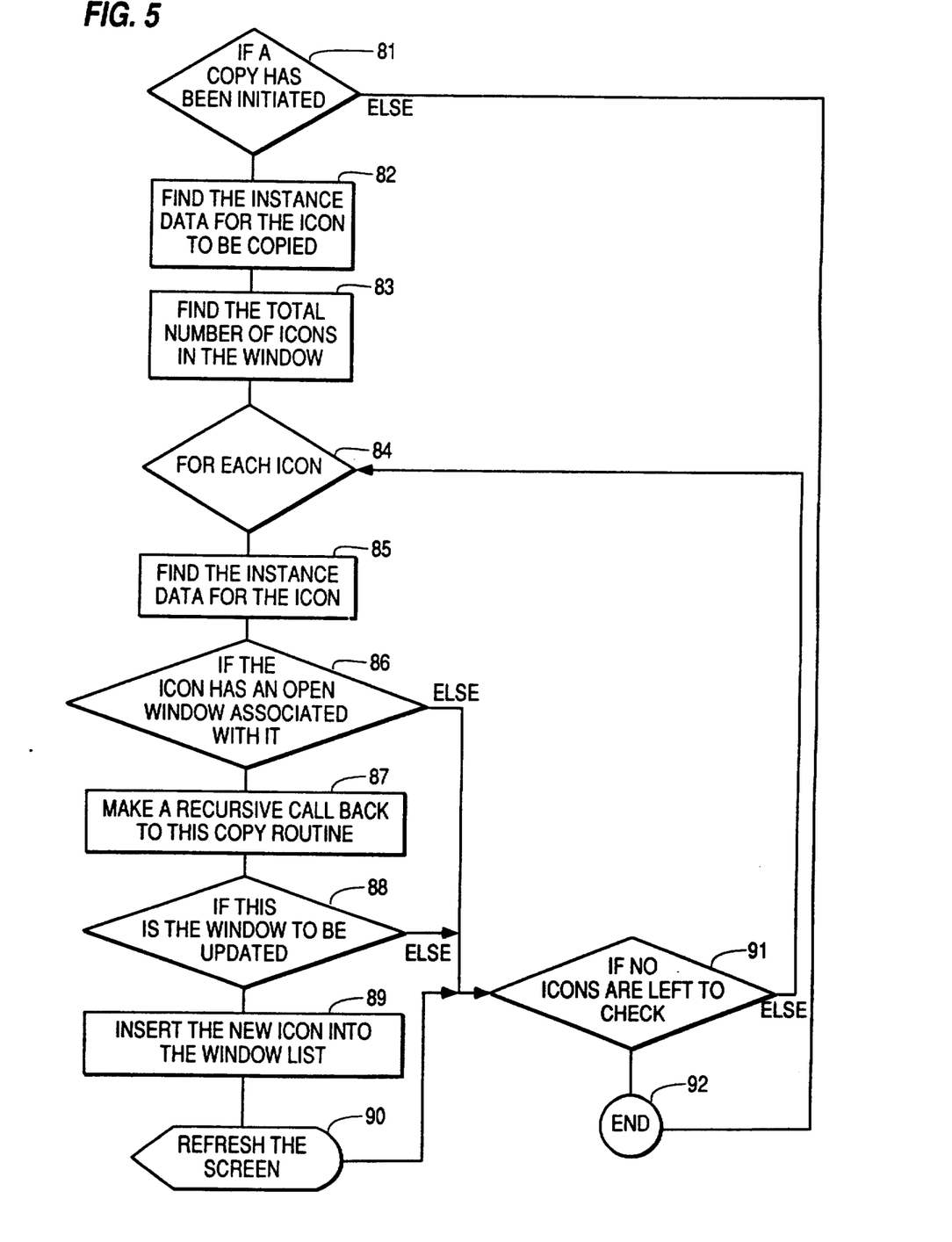
FIG. 5 is a flow diagram of a method according to the present invention.

FIG. 5 depicts a flow diagram of the present invention where the user has elected to copy an icon and its associated data to a parent window and all child windows associated with it. In step 81, the user has marked an item or icon and selected a copy operation. Next, in step 82, the update code finds the instance data associated with the icon to be copied. Next, in step 83, the update code finds the total number of icons in the window. Step 83 sets up step 84 where the update code determines whether a copy has been initiated for each icon if a copy has been initiated for an icon, step 81, the instance data for the icon is copied, step 82 the update code goes through this loop until all the icons have been examined. As noted above, the instance data in the preferred embodiment has a field which indicates with which windows the icon is associated. In step 85, the update code looks at the instance data a second time to prepare for step 86. In step 86, if the icon has an open window associated with it this means that there is a open window which must be refreshed on the display. If there are no open windows the update code only makes changes to the data about the entry or nickname list in the database. A recursive call is made back to the update and copy routine which starts in step 81. In step 88, the update code determines whether the window is to be updated, i.e., the marked icon would be inserted into the window. If so in step 89, the icon is inserted into the window. In step 90, the update code sends information to the computer to refresh the display to present the copied icon to the user. After all the icons and all the associated windows have been checked the update code ends, step 91.

Figure 6:
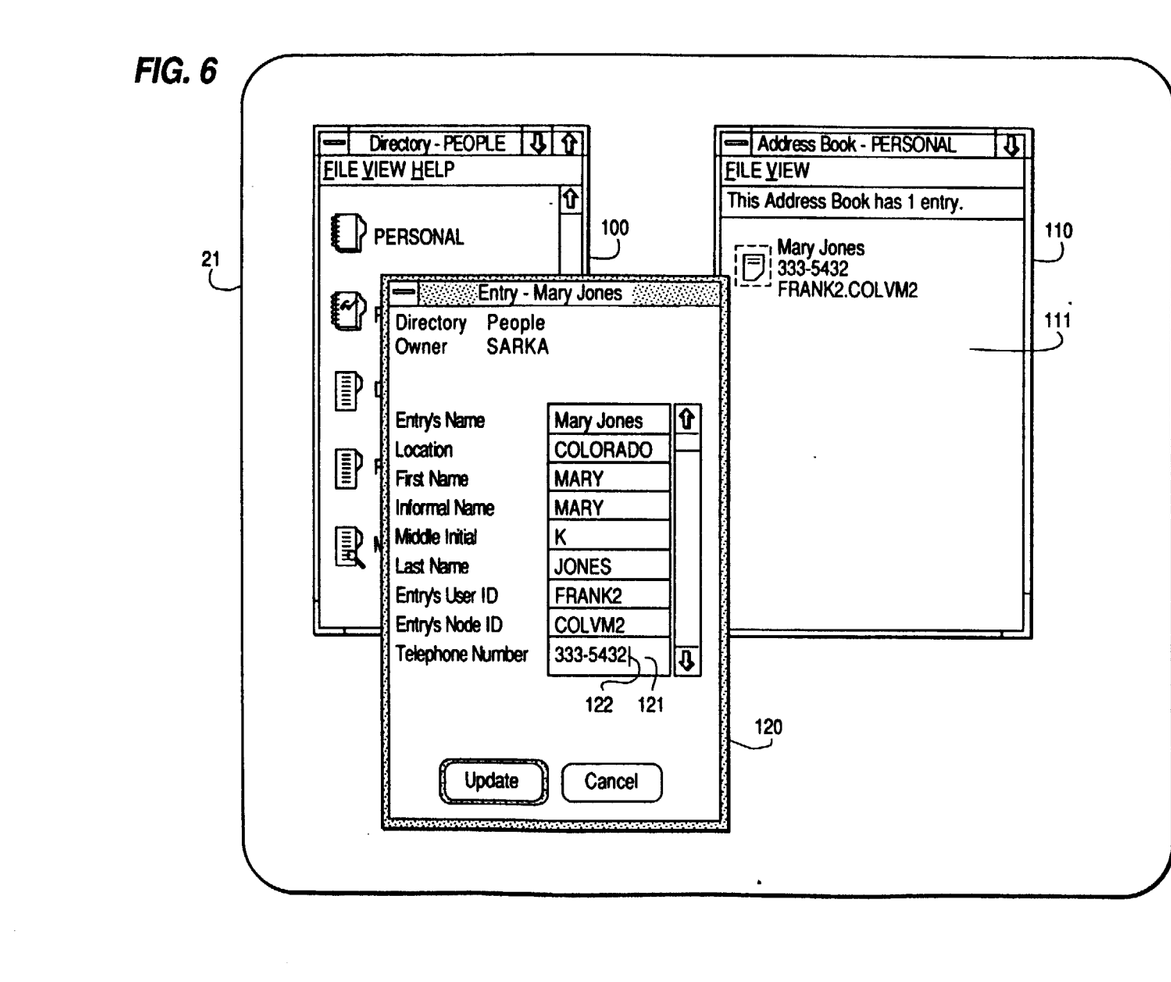
FIG. 6 is a pictorial representation of a computer display in a multiwindow graphical interface of a second embodiment of the present invention where uncommitted changes in child windows are aaved before closing a parent window.
Figure 7:
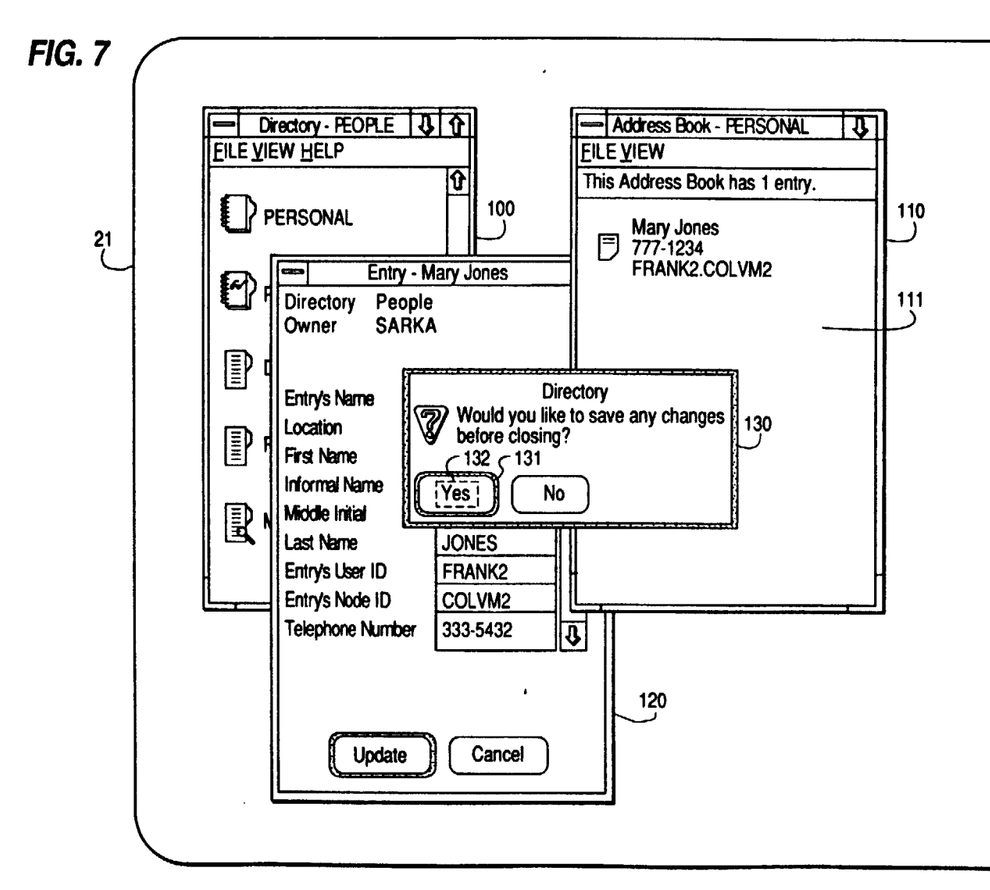
FIG. 7 is a pictorial representation of the windows depicted in FIG. 6 where the user is queried whether uncommitted changes should be saved.
Figure 8:
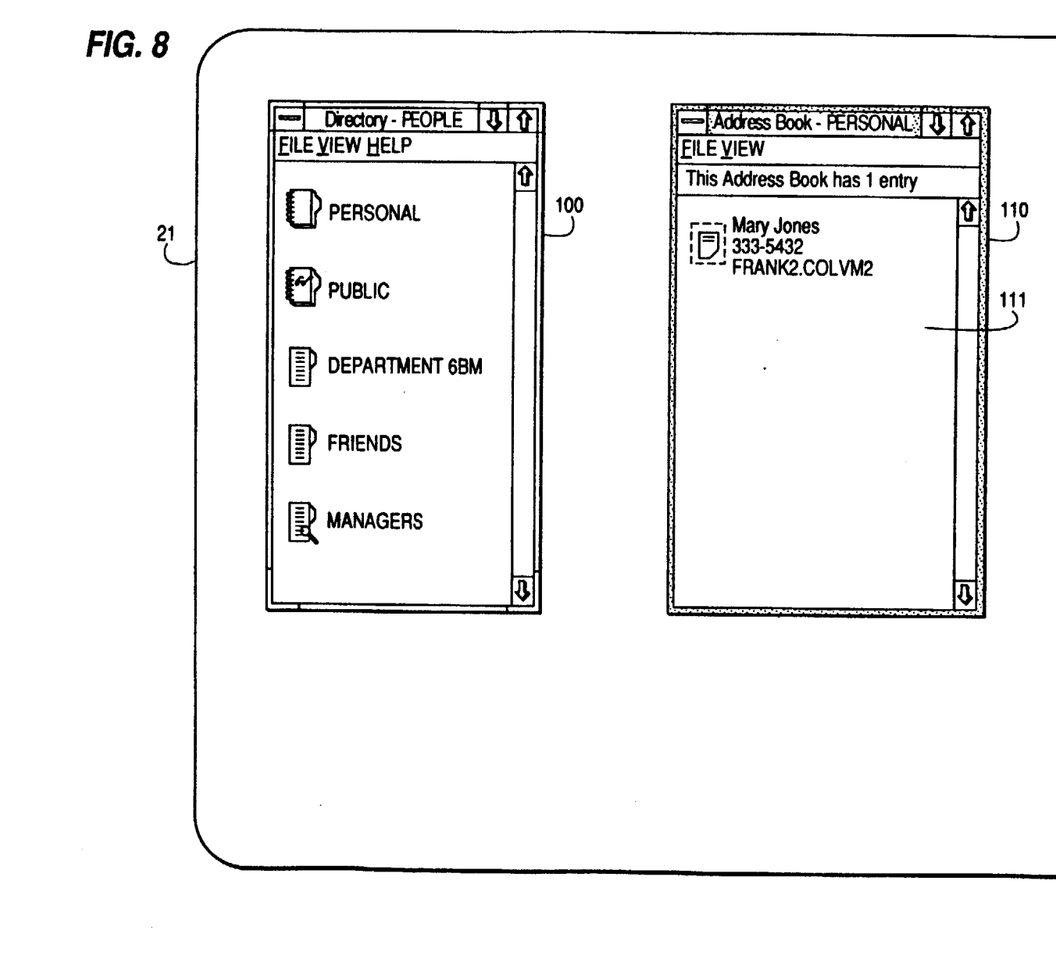
FIG. 8 is a pictorial representation of the windows in FIG. 6 where previously uncommitted changes in child windows have been made.

Another embodiment of the present invention is illustrated in FIGS. 6 to 8, where uncommitted changes are saved in the child windows of a parent window which the user wishes to close. An "uncommitted change" is made by the user when she modifies data in 9 window, e.g., the entry window 100, without executing the update button, or otherwise saving the change, and then moves to a new window to manipulate data in the new window. FIG. 5 depicts the People Directory window 100 which is a parent window to the personal address book window 110 and the Mary Jones entry window 120. In FIG. 5, the user has just completed changing the data in the telephone number data field 121 as indicated by the user 122.

In FIG. 7, the user has changed the active window of the application to the People Directory window 100 without updating the changes in the Mary Jones entry window 120. Then she has indicated that she wants to close the People Directory window 100. In response to this set of user inputs, the data processing system displays a dialog box 130, which queries the user whether any of the uncommitted changes should be saved before closing. If the answer is yes, the user activates the yes push button 131 by moving the cursor 132 to the button 131 and pressing the mouse button. Those skilled in the art would recognized that other methods of allowing the user to save uncommitted changes are available.

After the user has indicated that she wishes to save uncommitted changes before closing the People Directory window 100, the update code then searches its child windows. In OfficeVision/2 this is done by revealing the instance data of the icon present in the directory window 100. This is true because the child windows would be associated with an icon in a parent window. By searching through the instance data of each icon, the update code determines whether or not the icon has a window. Next, for each icon which represents a child window the update code then searches all of its icons for their instants data to determine which of these icons are also child windows. Thus all the child windows will be searched simultaneously. If any of the windows or dialog boxes have uncommitted changes, a Save-Changes procedure is called to save all the uncommitted changes in all of the child windows.

In FIG. 8 a pictorial representation is shown of the People Directory window 100 and the personal address book window 110 upon the next opening of these two windows by the user. Comparing the Mary Jones entry in the client area 111 of the personal address book 110 window. In FIG. 8 versus FIGS. 6 and 7, one will note that the telephone number has been changed. Thus the present invention has been used to save an uncommitted change made in the child window when closing a parent window. Although a single uncommitted change was illustrated in the preceding paragraphs and accompanying drawings, the present invention would automatically search through all child windows and save as many uncommitted changes in the child windows of the People Directory window 100 has were made by the user.

Figure 9:
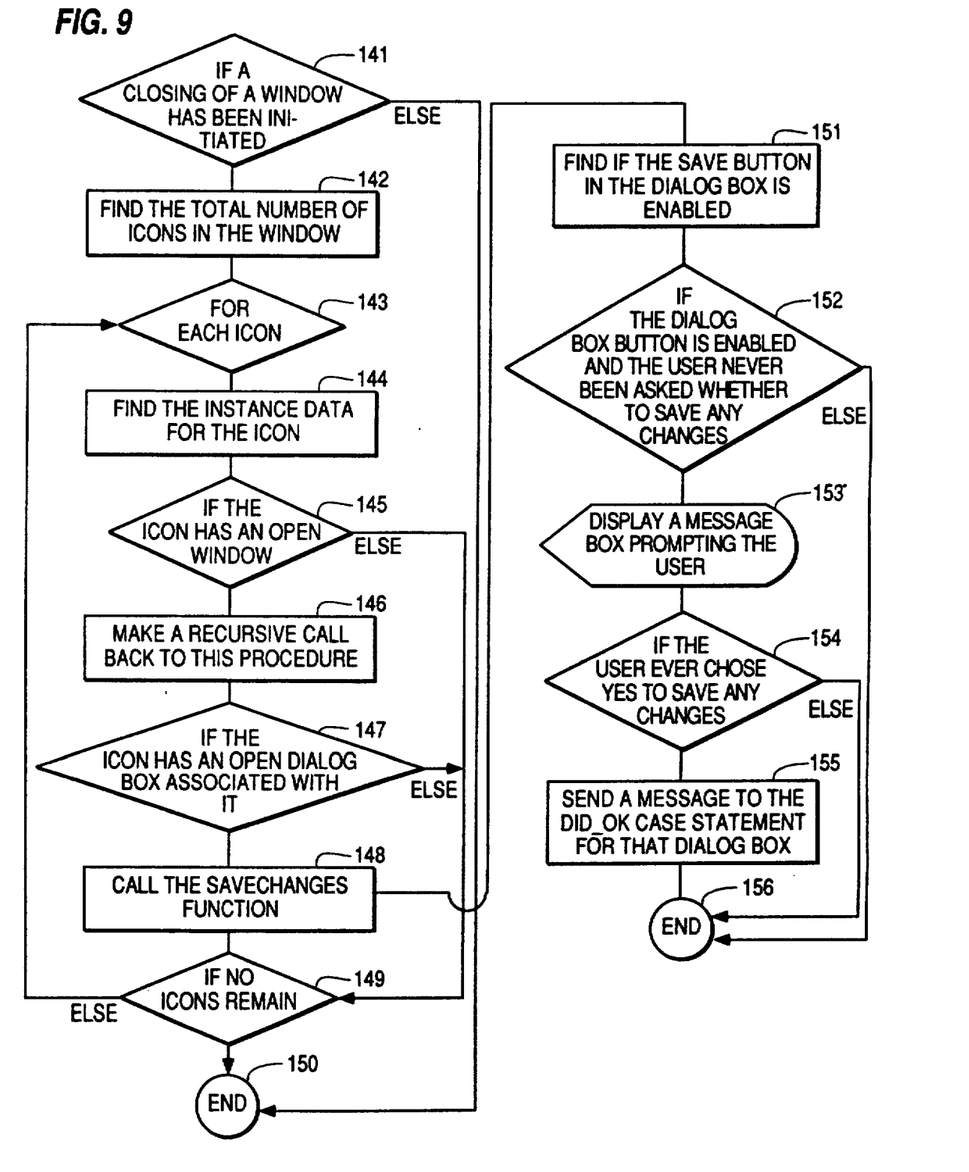
FIG. 9 is a logic flow diagram of a method to make uncommitted changes in child windows upon closing of the parent window.

FIG. 9 depicts a flow diagram of the uncommitted changes embodiment of the present invention.

The flow diagram begins as the user closes a parent window, step 141. In step 142, the total number of icons in that window are found to set up a loop where all icons will be checked. For each icon in the window, step 143, the instance data is found, step 144. If the instance data for that icon indicates that it has a child window, step 145, a recursive call is made back to step 141 for the child window, step 146. Thus, the update code will be running concurrently for each open child window of the parent window which was initially closed. In each window, the code will look for an uncommitted changes. In OfficeVision/2 an uncommitted change will be indicated by the icon having an open dialog box associated with it, step 148. If so, the Save-Changes procedure is called, step 118. After processing all icons in the window, the procedure then ends, step 150.

In the SaveChanges procedure, the dialog box is checked to see if its save button is enabled. The easiest way to accomplish this is in Presentation Manager is to map the button to DID—OK, a default which brings many of the icon handling features of Presentation manager automatically, step 151. If the save button is not enabled, the procedure is ended, step 156. If the save button is enabled and the user was never prompted to save uncommitted changes, step 152, a dialog box will be displayed prompting the user, step 153. If the user chooses to save the uncommitted changes, 154, a message is sent to the DID—OK case statement of the dialog boxes window procedure, step 155. The sending of this message will start the processing of the save using the DID—OK function. Once all uncommitted changes are saved, the procedure will end, step 156.

Next, a pseudocode version of the present invention as illustrated in FIGS. 2 through 5 follows.

A second pseudocode illustration follows. The second pseudocode illustrates the embodiment as shown in FIGS. 6 through 9 depicting the saving of uncommitted changes in child windows.

```
MRESULT APIENTRY PABMAINWndProc(hwnd, msg, mp1, mp2)
{
    .
    .
    .
case WM_COMMAND:
   switch (LOUSHORT(mp1))
   {
        .
        .
        .
      /* this is an example of a COPY being propagated throughout */
      /* multiple layers of windows.
      case MY_COPY:
            .
            .
            .
         /* look at all of the aliases in the window */
         for (iconsel=0; iconsel < iconTot; iconsel ++)
         {
```

```
    /* Get the associated instance data of the icon */
    WinSendMsg(hwndList, LM_DS_QUERYITEMSTRUCT, MPFROMSHORT(iconsel
              (MPARAM) &is);
    ListInfo = (LISTINFO *) is.pInstance;

/* look at each icon handle to see if it has an open window */
    if (ListInfo->hwnd != NULL)
    {
        /* start looking at icons in the newly found open window  */
        /* This is a recursive call back to this case statement   */
        WinSendMsg(ListInfo->hwnd, MY_COPY, Previs, mp2);
                        .
                        .
                        .

/* is the open window the one to be updated ? */
        if (WinCompareStrings(ChildWinInfo->glbs->hab,
            ChildWinInfo->glbs->codepage,
            ChildWinInfo->glbs->countrycode, buffer, mp2, NULL) ==
              WCS_EQ)
        {
            /* refresh the targeted window */
            CopyRefresh(ListInfo->hwnd, Previs);
        }
    }
}
        .
        .
        .

break;
  .}

MRESULT APIENTRY PABMAINWndProc(hwnd, msg, mp1, mp2)
{
        .
        .
        .
case WM_COMMAND:
  switch (LOUSHORT(mp1))
  {
        .
        .
        .

case WM_CLOSE:
        /* For every item in the list */
        for (i=0; i < itemcount; i++)
        {
                .
                .
                .

/* Get the icon's instance data */
            WinSendMsg(hwndList, LM_DS_QUERYITEMSTRUCT, MPFROMSHORT(i),
(MPRAM) &is);

ListInfo = (LISTINFO *) is.pInstance;

/* if the window associated with the icon is open */
            if (ListInfo->hwnd != NULL)
            {
                .
                .
                .
                */ Call the Save changes function */
                rc = SaveChangesDID_OK(hwnd, ListInfo->hwnd);
                if (rc == FALSE)
                   return FALSE;
```

```
            }
               .
               .
               .
          }
     break;
               .
               .
               .
     }
          .
          .
          .
}

BOOL  SaveChangesDID_OK(hwnd, hwndDlg)
}
          .
          .
          .

rc = (BOOL) WinIsWindowEnabled(WinWindowFromID(hwndDlg, DID_OK));

/* if the user has not been asked whether or not he/she wants any */
     /* changes to be saved, and the window has an enabled update push */
     /* button, then put up the message box.  The message box will     */
     /* prompt the user to save any changes.                           */
     if (ChildWinInfo->glbs->Save == -1 && rc == TRUE)
     {
          .
            .  .

rcode = WinMessageBox(HWND_DESKTOP, hwnd, szString, Title, 0,
                    MB_ICONQUESTION | MB_YESNO | MB_SYSTEMMODAL);
     ChildWinInfo->glbs->Save = rcode;
}

/* if the user chose YES from the message box at this point or at an */
/* earlier point in time, save all of the changes                    */
if ((rcode == MBID_YES) ||
    (rc == TRUE && ChildWinInfo->glbs->Save == MBID_YES))
{
     /* Send a message to each open application to save any changes */
     rc = (BOOL)WinSendMsg(hwndDlg, WM_COMMAND, (MPARAM) DID_OK, OL);
          .
          .
          .

}
     .
     .
     .
}
```

While the invention has been described with respect to a particular preferred embodiment it would be understood by those skilled in the art that modifications may be without parting from the spirit and the scope with the present invention. The embodiment presented above or for purposes of example and illustration only, and are not to be taken to limit the scope of the appended claims.

I claim:

1. In a data processing system including a processor, a memory, display means and input means, a method of simultaneously updating hierarchically related windows within a multiwindow graphical interface in which the hierarchically related windows are elements in a logical ranking, the method comprising the steps of:
 responsive to a first input by a user indicating that a first set of data within a first window is to be updated, searching for at least a second hierarchically related window;
 searching said second hierarchically related window for a second occurrence of said first set of data;
 upon finding said first set of data in said hierarchically related second window, simultaneously updating said first set of data in both said first window and said second hierarchically related window without requiring the user to manipulate within said second related window.

2. The method as recited in claim 1 wherein said second hierarchically related window is a child window.

3. The method as recited in claim 1 wherein said second hierarchically related window is a parent window.

4. The method as recited in claim 1 wherein the first searching step for said hierarchically related second window is performed by searching a data structure associated with said first window.

5. The method as recited in claim 1 wherein the first searching step for said hierarchically related second window is performed by searching a data structure associated with a root window in the logical ranking.

6. The method as recited in claim 1 wherein the first set of data is found in a first plurality of hierarchically related windows and the first set of data is updated in all of the first plurality of hierarchically related windows.

7. The method as recited in claim 1 wherein the first set of data is found in a first plurality of hierarchically related windows and a menu is presented on the display means which allows the user to select which of the first plurality of hierarchically related window is to be updated.

8. A data processing system for simultaneously updating hierarchically related windows within a multiwindow graphical interface in which the hierarchically related windows are elements in a logical ranking comprising:

a processor for controlling an operation of other components of the data processing system;

a memory coupled to the processor for storing sets of program instructions used by the processor to control the data processing system;

input means coupled to the processor and the memory to allow a user to input data and commands to the data processing system;

display means coupled to the processor and the memory for displaying a set of results of commands entered with the input device;

first search means coupled to the processor, responsive to a first input by the user indicating that a first set of data within a first window is to be updated, for searching for at least a second hierarchically related window, second search means coupled to the processor for searching for a presence and location of the first set of data within the second hierarchically related window found by the first search means;

update means coupled to the processor, for simultaneously updating both the first window and the second hierarchically related window if the data to be changed is found within the second related window by the second search means, without requiring the user to manipulate in the second related window.

9. The system as recited in claim 5 wherein the first search means searches for the presence of the second hierarchically related window in a data structure associated with said first window.

10. The system as recited in claim 5 wherein the first search means searches for the presence of the second hierarchically related window in a data structure associated with a root window in the logical ranking.

11. The system as recited in claim 5 which further comprises a selection means which allows the user to select which of a plurality of hierarchically related windows having the first set of data found by the first second search means is to be acted upon by the update means.

* * * * *